July 5, 1960  J. E. ANDERSON  2,944,203
AUTOMATIC PILOT SERVOSYSTEM
Filed Feb. 24, 1958  2 Sheets-Sheet 2

INVENTOR.
J. E. ANDERSON
BY *Gordon Reid*
ATTORNEY

_United States Patent Office_ 2,944,203
Patented July 5, 1960

2,944,203

AUTOMATIC PILOT SERVOSYSTEM

John Edward Anderson, Minneapolis, Minn., assignor to Minneapolis-Honeywell Regulator Company, Minneapolis, Minn., a corporation of Delaware Filed Feb. 24, 1958, Ser. No. 716,972

14 Claims. (Cl. 318—489)

The present invention relates to dirigible craft control apparatus and more particularly to apparatus for controlling an aircraft in flight.

Control apparatus for an aircraft which are commonly known as automatic pilots utilize in many instances, a horizon gyro for stabilizing the craft about its roll and pitch axes. In general, such horizon gyro comprises a rotor mounted in an inner gimbal ring with its spin axis in a vertical to the earth surface. The gimbal in turn being mounted on trunnions supported in an outer gimbal. The outer gimbal in turn has trunnions which are journaled about an axis perpendicular to the axis of the first gimbal. Generally, movement of the outer gimbal is used to sense bank angle whereas movement of the inner gimbal is adapted to sense pitch attitude or pitch angle of the craft.

While such arrangement, of the horizon gyro is suitable for stabilizing the attitude of flight of the craft about the roll and pitch axes, in some instances, it may be desirable to control the craft about its pitch axis from a second controller involving a second flight condition rather than controlling attitude from the horizon gyro. In such control to the second flight condition, the aircraft may attain a high pitch attitude, for example, relative to its normal horizontal position. The horizon gyro during the control of the craft by the second control device may be utilized to sense pitch attitude of very high values in the nature of ninety degrees or higher and control an operation when the craft has attained a predetermined attitude. Such operation by the gyro may involve the energization of an indicator or other device.

In order that the gyroscope may be utilized for such alternative purposes, it is desirable that it have three hundred sixty degrees freedom in the pitch axis. This extent of freedom in the pitch axis is not obtained by the conventional mounting of the horizon gyro since such mounting of the gyro utilizes mechanical stops in many instances, to limit the displacement, conventionally in pitch, to prevent alignment of the spin axis with the conventional longitudinal axis or bank axis such alignment being termed gimbal lock.

To obtain the 360° freedom in pitch, it is necessary to mount the horizon gyro at right angles, in the horizontal plane, from its conventional mounting. However, when the horizon gyro in its modified mount is utilized in an automatic pilot to stabilize pitch attitude of the craft, for example, at an upward inclination of the craft rather than a level position, an apparent change in pitch attitude of the craft sensed by the horizon gyro occurs when the aircraft banks while in such inclined position and results in undesired operation of the automatic pilot.

Therefore an object of this invention is to provide a new compensating means for a two axis gyroscope to prevent undesired operation of an automatic pilot.

A further object of this invention is to provide a new compensating means for an automatic pilot controlled to high pitch attitudes by a horizon gyro.

Another object of this invention is to provide means to compensate an automatic pilot controlled by a gyro horizon for unwanted effects due to changes in roll attitude, while controlling to pitch attitude.

A further object of this invention is to provide compensating means for opposing apparent changes in attitude about one axis sensed by a gyro horizon due to changes in attitude about an axis normal to the one axis.

A further object of the invention is to utilize a single gyroscope alternatively in two sub-systems to reduce the number of gyroscopes necessary for the sub-systems.

The above and other objects of the invention will more readily appear from the following specification and drawings wherein.

The number of vertical gyroscopes carried on an aircraft, wherein one gyroscope is used in an automatic pilot to stabilize craft attitude and another gyroscope is utilized extraneous to the autopilot during a command maneuver as merely an attitude monitoring or sensing device, can be reduced if several sub-systems such as the autopilot, and the attitude sensing device receive attitude signals from the same vertical gyroscope. A reduction in the weight carried by the craft by reducing in number the gyroscopes carried aboard an aircraft may be accomplished by using the vertical gyroscope with a compensation therefor, not only merely as a sensing device but also for an attitude reference for the automatic flight control system.

The type of vertical gyroscope herein involved is of the two axis or freedom type and consists as stated of a rotor mounted in an inner gimbal for rotation about a vertical spin axis. The inner gimbal in turn is pivotally mounted in an outer gimbal at an angle normal to the spin axis. In turn the outer gimbal is mounted in a casing fixed to the craft for rotation on an axis in a direction normal to the axis of the inner gimbal. Generally stop means are provided to limit the relative angular movement of the inner gimbal relative to the outer gimbal to avoid gimbal lock. In order to avoid gimbal lock or gimbal flip resulting from the engagement of said stops, as when it is desired to sense very high pitch attitudes of an aircraft, such gyroscope must measure roll between the inner gimbal and the outer gimbal and pitch attitude between the outer gimbal and the gyro or airframe. Since the outer gimbal axis is thus fixed to the aircraft, the outer gimbal angle is always an angle in the plane of symmetry of the aircraft i.e. a plane containing the longitudinal and vertical axes of the aircraft.

If the outer gimbal angle is used in automatic pilot control as a pitch attitude reference, a compensation scheme must be used to avoid coupling between roll and pitch angles of the aircraft. Without such compensations, rolling motions of the aircraft about its longitudinal axis will cause apparent pitch attitude change of the aircraft on the gyroscope resulting in nuisance operations of the autopilot. This phenomenon of cross coupling and a compensation arrangement therefore has been provided in a portion of a three channel automatic pilot, the portion being concerned with the control of pitch attitude of the craft.

Figure 2:
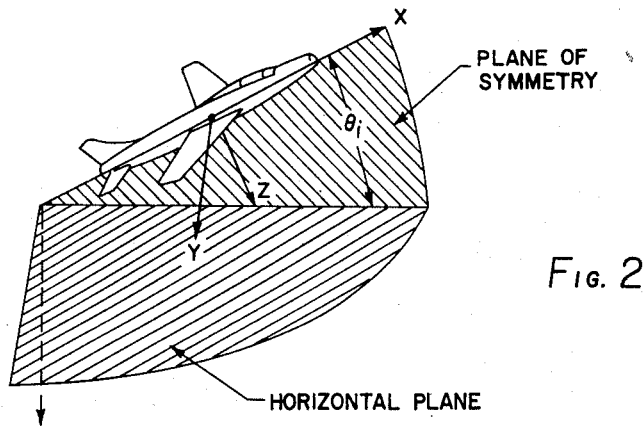
Figure 2 is an illustration of an aircraft having level roll attitude but an upwardly inclined pitch attitude.
Figure 3:
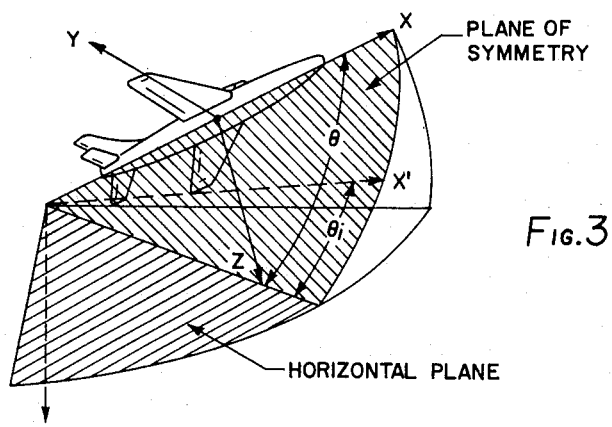
Figure 3 illustrates the theory of the invention by illustrating the apparent change in pitch attitude due to banking of the craft while at the inclined attitude.
Figure 4:
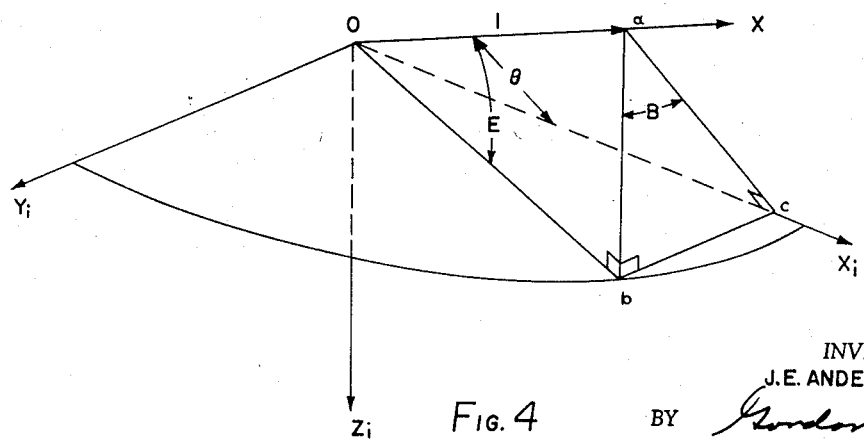
Figure 4 is a geometrical explanation for the novel compensating means.

The coupling phenomenon and its compensation will be considered with reference to Figures 2, 3, and 4. The phenomenon will be considered in which the aircraft initially is in a nose-up attitude and thereafter a change in roll attitude occurs due to an aileron deflection or other cause.

In Figure 2, the aircraft is shown in the "nose-up attitude" at an angle $\theta_1$ to the horizontal. The angle $\theta_1$ is in the plane of symmetry of the aircraft which plane is perpendicular to the horizontal plane.

In Figure 3, the aircraft is shown in an altered position. This altered position is attained sequential to the craft attitude in Figure 2. If there is no deflection of the elevator from the trim position, and with the aircraft changing merely its roll attitude about its longitudinal axis, the outer gimbal pitch angle increases rapidly as the aircraft rolls. The change in the outer gimbal pitch angle due to a pure rolling motion is indicated in Figure 3. Even though the direction of flight (X-direction) is unchanged by such rolling, the value of the pitch angle $\theta_1$ increases considerably. The pitch angle referred to the gyroscope as now increased to angle $\theta$.

If the outer gimbal pitch angle $\theta$ is used directly as an aircraft elevator control signal, the elevator will not remain in the trim position but will deflect an amount proportional to the instantaneous difference between $\theta$ and $\theta_1$ Figure 3, and in a direction tending to make $\theta$ equal $\theta_1$ throughout the rolling maneuver. After such rolling maneuver, the X axis of the aircraft will be in a position X' as indicated in Figure 3. In other words the automatic pilot tends to reduce the inclination of the aircraft to the horizontal or to the earth's surface.

The above coupling from roll to pitch will cause undesirable changes in the direction of flight of the aircraft when pure rolling maneuvers are applied to the aircraft. In addition, a normal acceleration associated with this undesirable change will also occur.

The basis for the compensation scheme as will be explained by reference to Figure 4 is expressed in the equation sine $E$=sine $\theta$ cosine $B$. In this equation, E, the elevation angle, is the angle between the longitudinal axis of the aircraft and a horizontal plane, measured in a vertical plane. B, the bank angle, is the angle between a line perpendicular to the plane of symmetry of the aircraft and a horizontal plane measured in a vertical plane. Such perpendicular line is represented by line Y in Figures 2 and 3. $\theta$, the pitch angle, is the angle between the longitudinal axis of the aircraft and a horizontal plane measured in the plane of symmetry of the aircraft.

The derivation of the above equation will be stated with reference to Figure 4. In Figure 4, the plane $X_oX_1$ is the plane of symmetry of the aircraft. A perpendicular line is drawn from the point $a$ to the horizontal $X_1OY_1$. The perpendicular intersects the $X_1OY_1$ plane at the point $b$. Then $oab$ is a right triangle and the side $ab$=sine $E$. A second perpendicular line extends from point $a$ to the $X_1$ axis. This second perpendicular intersects the axis at $c$. Then $oac$ is a right triangle and the side $ac$=sine $\theta$. Since side $ab$ is perpendicular to the $X_1OY_1$ plane, $abc$ is a right angle. Therefore, $$\text{cosine } B = \frac{ab}{ac} = \frac{\text{sine } E}{\text{sine } \theta}$$

or sine $E$=sine $\theta$ cosine $B$.

I have stated that triangle $oca$ is the plane of symmetry of the aircraft. Also triangle $oac$ is a vertical plane. Thus triangle $oac$ has an inclination to the plane defined by angle $bac$ and such inclination is the bank angle B of the craft. The mechanization of the compensation equation sine $E$=sine $\theta$ cosine $B$ will be clarified with reference to Figure 1.

Figure 1:
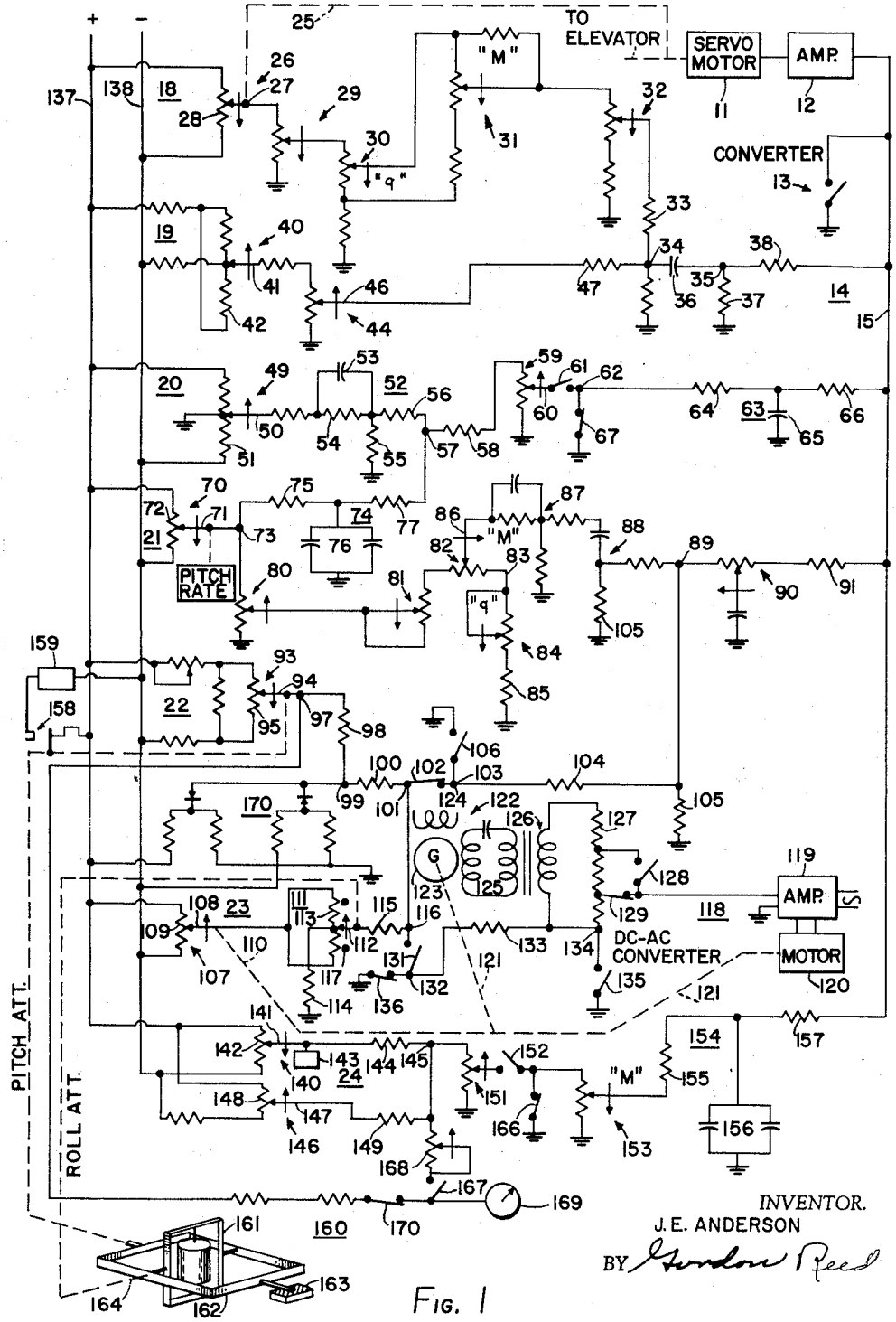
Figure 1 is a schematic arrangement of an automatic pilot including a horizon gyro and embodying the novel compensating means.

Figure 1 is a schematic diagram of a pitch channel of a three channel automatic pilot similar to that disclosed in U.S. application Serial Number 553,131, by Corles M. Perkins, filed December 14, 1955. Figure 1 herein corresponds generally to Figures 3a and 3b of the aforesaid Perkins application wherein a hydraulic servomotor is controlled from a discriminator amplifier which in turn is controlled through a D.C.-A.C. converter by a balanceable, parallel summing, direct voltage network. Further, in view of the fact that the invention has its utility during the time that the automatic pilot is operative to control the craft attitude, only the features of the pitch channel of the automatic pilot are shown in Figure 1 which are concerned with the control of the aircraft attitude through the automatic pilot. In other words, Figure 1 shows features of the pitch channel of the automatic pilot which are effective during the engage mode of the automatic pilot when it controls the craft.

In Figure 1, a servomotor 11 is controlled from an amplifier 12 which has supplied thereto alternating voltage signals from a D.C. to A.C. converter 13 which is connected to a summing conductor 15 of a balanceable, parallel summing, direct voltage network 14. The servomotor, amplifier, converter, and summing network may be similar to that disclosed in the aforesaid application of Corles M. Perkins. The servomotor 11 is utilized to position pitch attitude control means such as an elevator surface (not shown) of an aircraft.

Summing conductor 15 of network 14 receives and sums a plurality of D.C. voltage signals. These signals in the engage mode are a pitch autopilot servo feedback signal from voltage signal generator 18, a voltage from up elevator signal generator 19, a voltage signal from a pitch control stick steering signal generator 20, a voltage from a pitch rate signal generator 21; a voltage from a vertical gyro pitch attitude signal generator 22; a voltage from a pitch synchronizer signal generator 23; and a voltage from a normal acceleration generator 24.

Signal generator 18 comprises a pitch servomotor position potentiometer 26 comprising an operable slider 27 and a potentiometer resistor 28. Slider 27 is operated in either direction along resistor 28 from a normal position thereon by a suitable operating means 25 extending from an output member of servomotor 11. The output voltage from signal generator 18 appearing on slider 27 is applied to a control stick scheduling potentiometer 29. From this scheduling potentiometer, the voltage is applied to a "$q$" scheduling potentiometer 30 and thence to a "mach" scheduling potentiometer 31. From the latter scheduling or gain potentiometer, the voltage is applied to a ratio potentiometer 32, and from this potentiometer the voltage is supplied through a summing resistor 33 to an intermediate summing point 34. Summing point 34 is connected through a high pass network 35 comprising a capacitor 36 and resistor 37, and through a summing resistor 38 to the network summing conductor 15.

Signal generator 19 comprises an up elevator potentiometer 40 having an adjustable slider 41 and resistor 42. Slider 41 is adjusted in either direction from a midpoint of resistor 42 by a suitable operating means in accordance with the roll attitude of the aircraft. Potentiometer 40 has the connection of its resistor to supply conductors so arranged that irrespective of the direction of bank of the aircraft, signals of a single phase are obtained from the potentiometer tending to cause upward displacement of the elevator surface. The output from the potentiometer 40 appearing on slider 41 applied to an up stabilizer adjustment potentiometer 44. Slider 46 of this potentiometer is connected through a summing resistor 47 to the summing point 34.

Signal generator 20 comprises a pitch control stick steering potentiometer 49 having an adjustable slider 50 and a resistor 51. Resistor 51 has a center tap connected to signal ground. Slider 50 is displaced relative to the center tap of resistor 51 from the conventional control stick of the aircraft in accordance with the effort supplied by the pilot of the aircraft to such control stick as more fully disclosed in the aforesaid Perkins application. The output from signal generator 20 appearing on slider 50 is applied to a lead network 52 comprising a resistor 54 and capacitor 53 in parallel and thence through resistor 55 to signal ground. The junction of resistors 54 and 55 is connected through resistor 56 to a second intermediate summing point 57. The summing point 57 is connected to network summing conductor 15 through circuit forming elements comprising a resistor 58 extending from terminal 57 to a pitch control stick steering adjustment potentiometer 59. A slider 60 of this potentiometer is connected through a single pole double throw switch 61 to a terminal 62 from which the cirucit continues through a lag network 63, comprising resistor 64 and capacitor 65, and summing resistor 66 to network summing conductor 15. Terminal 62 may be bypassed to signal ground through a single pole, double throw switch 67.

Signal generator 21 comprises a craft pitch rate potentiometer 70 having an adjustable slider 71 and resistor 72. Slider 71 is displaced along resistor 72 in accordance with the pitch rate of the aircraft by a conventional one degree of freedom pitch rate gyro 78. The output of signal generator 21 appearing on slider 71 is applied to an intermediate terminal 73 from which two parallel pitch rate signal branches extend to summing conductor 15. One branch comprises a lag network 74 having a resistor 75 connected to terminal 73 in series with parallel condensers 76 which are connected to signal ground. The terminal of resistor 75 and capacitors 76 is connected through a resistor 77 to the second intermediate summing point 57.

The second branch extends from terminal 73 and through a lag pitch rate adjustment potentiometer 80 and a variable resistor 81 to a voltage dividing potentiometer 82, and continues to a terminal 83. From terminal 83 the circuit branch continues through a variable resistor 84 adjusted in accordance with "$q$" and a fixed resistor 85 to signal ground. A sub-branch circuit extends from a slider 86 of the voltage dividing potentiometer 82 through a lead network 87 and lag network 88 to a minor terminal 89. From terminal 89 the circuit extends through a further resistor-capacitor lag network 90 and a summing resistor 91 to the network summing conductor 15.

Signal generator 22 comprises a vertical gyro operated pitch attitude potentiometer 93 comprising a slider 94 and resistor 95. Slider 94 may be displaced along resistor 95 by a suitable operating means in accordance with the pitch attitude of the aircraft. The output of signal generator 22 appearing on slider 94 is supplied to a connector terminal 97 and thence through a summing resistor 98 to a second terminal 99. From terminal 99 the circuit extends through a resistor 100, to a further terminal 101, from summing terminal 101 the circuit extends through a single pole, double throw switch 102, terminal 103, summing resistor 104 to terminal 89. Terminal 89 is shunted to ground through a resistor 105.

Pitch synchronizing signal generator 23 comprises a potentiometer 107 having an adjustable slider 108 coacting with a potentiometer resistor 109. Slider 108 may be displaced along resistor 109 by a suitable operating means 110, to be described. The output of signal generator 23 appearing on slider 108 is applied to a resistor 113 of a potentiometer 111. Potentiometer 111 includes an operable slider 112 and the arrangement is such that the output from potentiometer 111 appearing on slider 112 is of the phase as the voltage supplied thereto. Resistor 113 includes a center tap connected to signal ground through a resistor 114. Slider 112 is positioned along resistor 113 in accordance with a function of roll angle of the craft about its longitudinal axis. For the purpose of preventing gimbal lock, that is, alignment of the gyro spin rotor axis with the pivotal axis of the outer gimbal of the gyroscope, stop means 117 are provided which may intercept the path of slider 112 in either direction before it has reached the full extent of movement along resistor 113.

It is apparent that the voltage on synchronizing potentiometer slider 108 is multiplied by the adjustment of potentiometer 111, and the arrangement should be such that the voltage on slider 108 is multiplied by the secant of the bank angle for reasons explained hereinafter. This may be effected by having the potentiometer winding 113 suitably characterized or the operating means for slider 112 may be adapted to provide the adjustment of slider 112 in accordance with the secant of the bank angle in which case resistor 113 may be linear.

The output from potentiometer 111 appearing on slider 112 is supplied through a summing resistor 115 to a terminal 116 which in turn is connected to the further terminal 101.

Signal voltage providing potentiometer resistors 28, 42, 51, 72, 95, 109 and similar potentiometer resistors to be described are connected across primary direct voltage supply conductors connected to a suitable source.

As thus far described and illustrated in Figure 1, and assuming pure pitch attitude motions of the aircraft, the aircraft will be stabilized about its pitch axis relative to the earth by the operation of slider 94 in accordance with pitch attitude of the aircraft.

In some instances it may be desired to alter the stabilized attitude of the aircraft and for this purpose, the pitch attitude signal generator 22 is rendered ineffective to control craft pitch attitude. Were pitch attitude stabilization to be subsequently applied after such altering of pitch attitude, it is desirable that the summing terminal 101 connected to signal generator 22 should be, in a signal voltage sense, trimmed to the new attitude of the aircraft to avoid an abrupt operation of the attitude changing means.

For the purpose of trimming or synchronizing the attitude stabilization voltage from potentiometer 93 and applied at terminal 101 in accordance with the new attitude of the aircraft, a separate sub-system comprising a servo mechanism 118 has been provided. This sub-system termed a pitch synchronizer comprises an alternating voltage discriminator amplifier 119 which controls a motor 120. Motor 120 through suitable operating means 121 drives a rotor 123 of a velocity signal generator 122. The generator 122 includes a primary winding 124 connected to an alternating voltage source. The winding 124 is inductively coupled to a secondary winding 125 through the rotor 123 and the speed of rotor 123 determines the magnitude of voltage induced in winding 125. The output of secondary winding 125 is applied across a transformer 126 having its secondary winding connected across a voltage dividing resistor 127. The voltage dividing resistor 127 includes a pair of taps. The taps through single pole double throw switches 128 or 129 may be selectively coupled to the input of the amplifier 119.

During the period when the attitude of the craft is to be changed and not stabilized, terminal 116 may be connected through a single pole, double throw switch 131 to a terminal 132 and thence through a summing resistor to a terminal 134. At terminal 134 a D.C. to A.C. converter 135 converts the D.C. signal to A.C. This voltage in turn is placed in series with a portion of the A.C. voltage on voltage dividing resistor 127 and applied to amplifier 119.

Such attitude change may be effected by the operation of the control stick steering potentiometer slider 50, and during such operation the switch 61 is moved to closed position whereas switch 67 is moved to open position. Furthermore switch 102 is moved to open position and switch 106 is moved to closed position. When the single pole, double throw switch 131 is opened, the terminal 132 is connected through a second single pole double throw switch 136 to ground, to ground amplifier 119.

Thus far, the apparatus has been described as being capable of maintaining a desired pitch attitude which is one flight condition of the aircraft, furthermore, the aircraft may be manually controlled through the automatic pilot to select a different attitude to be stabilized. In addition, it may be desired to automatically control the aircraft through the automatic pilot in accordance with a second flight condition of the aircraft. This second flight condition may involve controlling the aircraft to a desired rate of change of pitch attitude or causing the aircraft to fly at a normal acceleration beyond that existing during pitch attitude stabilization.

By way of example, additional circuitry has been provided to effect flight of the aircraft at a selected number of G's normal acceleration. This acceleration is in the direction of the vertical axis of the aircraft. Such second flight condition control is provided by the signal generator 24. This signal generator comprises a craft normal acceleration potentiometer 140 comprising an adjustable slider 141 coacting with a resistor 142. Slider 141 is adjusted in either direction along resistor 142 by a normal accelerometer 143 responsive to craft normal acceleration. The output of potentiometer 140 appearing on slider 141 is transmitted through a summing resistor 144 to a minor summing point 145. Signal generator 24 includes a second potentiometer 146 having an adjustable slider 147 coacting with a potentiometer resistor 148. Slider 147 may be adjusted in accordance with the selected number of "G's" which it is desired that the aircraft maintain in its second flight condition. The output of potentiometer 146 appearing on slider 147 is connected through a summing resistor 149 to terminal 145. Terminal 145 is connected through a "G" gain adjustment voltage divider 151 and through a normally open single pole, double throw switch 152 to a gain adjustment potentiometer 153 adjusted in accordance with "Mach." From an adjustable slider of potentiometer 153 the circuit extends through a lag network 154, comprising a resistor 155 and capacitors 156, and thence through a summing resistor 157 to network summing conductor 15. When controlling to the second flight condition, the switch 152 is moved to closed position, but the vertical gyroscope operated signal generator 22 is rendered ineffective to control network 14. During this period of controlling to the second flight condition of selected normal acceleration, the terminal 101 again is electrically synchronized to the continually changing pitch attitudes of the aircraft occurring during application of the second flight condition.

During such control of the craft to the second flight condition, the aircraft will attain high pitch up attitudes which are to be monitored by the pitch attitude gyroscope. Such attitudes may exceed 90° of pitch attitude of the aircraft; and when a desired pitch attitude is attained, the gyroscope through a gyro operated device to be described effects operation of auxiliary equipment.

In order to correctly monitor the high pitch attitudes of the aircraft during control of the craft to selected normal accelerations, not encountered during pitch attitude control of the craft, a vertical gyroscope often termed a gyro horizon 160 has been provided. This gyroscope as shown in Figure 1 has a conventional rotor mounted in an inner gimbal 161 which in turn is journaled in an outer gimbal 162 about an axis 164 normal to the spin axis of the gyroscope rotor. In turn the outer gimbal 162 is journaled about an axis 163 normal to the spin axis and also normal or perpendicular to the axis 164 of gimbal 161. The gyroscope 160 is arranged in the aircraft so that the axis 163 of the gyroscope is in the direction of the lateral or pitch axis of the aircraft wehreas the axis 164 of inner gimbal 161 is positioned in the direction of the longitudinal axis of the aircraft. Conventionally gravity responsive means maintains the rotor spin axis vertical to the earth.

It was previously stated that gyro 160 should sense high angles of pitch up attitude during control to selected "G's." It was further stated that during pitch stabilization, such arrangement of gyroscope 160, necessary during attitude monitoring, introduced unwanted errors resulting from rolling motion of the craft. It was further shown that if the commanded pitch attitude were multiplied by the secant of the bank angle in accordance with the equation sine $\theta$ — sine $E$ secant $B=0$, that a compensation would be provided that would correct the pitch signal for the rolling action of the aircraft. This equation states that if a volatge proprtional to sine $\theta$ is compared with a constant voltage multiplied by the secant of the bank angle and the difference is zero, the elevation angle will be constant.

The features embodied in Figure 1 to provide this compensation may now be considered. The potentiometer 93 of signal generator 22 has its slider 94 positioned as stated in accordance with the pitch attitude of the aircraft. This pitch attitude, $\theta$, sensed by the gyro 160 may be converted to a sine $\theta$ signal output from potentiometer 93 by characterizing the resistor 95 in accordance with a sine function. In the present arrangement however, an alternative method utilizing a diode-limiting network 170 has been provided.

During the time that the automatic pilot is being controlled by operation of the control stick steering potentiometer slider 50, the gyro operated generator 22 will be rendered ineffective to control network 14. Instead, the output of signal generator 22 is applied to the pitch synchronizer sub-system 118 whereby motor 120 positions slider 108 in accordance with the signal from potentiometer 93 which has been made proportional to sine $\theta$.

We have stated that the resistor 113 engaged by the roll attitude potentiometer slider 112 is characterized in accordance with the secant of B or secant of the roll angle. Should the aircraft at this time while level laterally hold its pitch attitude taken as above the horizontal but thereafter change its attitude in roll, the signal on slider 108 will be modified in accordance with the secant of B. Thus if the pitch angle of the aircraft is changed due solely to roll of the craft, the pitch attitude of the aircraft relative to the earth (which is the constant voltage above) will be modified or increased by the secant of bank angle B, conscquently terminal 101 will remain at balance indicating that the elevation angle E is constant.

During the control of the aircraft to the selected normal acceleration, the single pole, double throw switch 166 which shunts the input to voltage divider 153 is in opened position. Additionally an indicator control switch 167 connects an indicator 169 through a variable resistor 168 to terminal 145 so that when any voltage appears at terminal 145 indicating that the aircraft is not flying at the selected normal acceleration a pointer of the indicator 169 will be displaced from its zero position.

However, when the aircraft is being controlled to pitch attitude stabilization, the indicator control switch 167 is moved to open position and a second indicator control switch 170 is moved to closed position at which time the indicator 169 is connected to terminal 97 to indicate pitch attitude.

The operation of the system in Figure 1 during the three modes of operation namely pitch attitude stabilization, control stick steering of pitch attitude, and selected normal acceleration will be briefly reviewed. When on pitch attitude stabilization, switch 61 is opened, switch 67 closed, switch 102 is closed, switch 106 is opened, switch 131 is opened, switch 136 is closed. For indication, switch 167 is opened, and switch 170 is closed. Changes in pitch attitude of the aircraft sensed by gyroscope 160 results in operation of slider 94. Such pitch attitude changes are caused by pitch rates which result in operation of slider 71 by rate gyroscope 78, thereby unbalancing network 14. Such unbalance results in the operation of amplifier 12 that controls servomotor 11. Motor 11 operates the pitch attitude changing means of the aircraft and through the follow-up means 25 operates slider 27 to rebalance network 14 to return the craft to the initial attitude.

Should the pilot desire to alter the pitch attitude of the aircraft from the initial attitude, he closes switch 61, opens switch 67, closes switch 106, opens switch 102, closes switch 131, and opens switch 136. Manual operation of the control stick steering slider 50 unbalances potentiometer 49 and the signal from potentiometer 49 is applied to network 14 to ultimately effect operation of amplifier 12 and motor 11 whereby the pitch attitude changing means effects a change in pitch attitude of the aircraft.

Any change in pitch attitude sensed by the vertical gyroscope 160 results in displacement of slider 94. The voltage from signal generator 22, when on control stick steering, is applied through closed switch 131 and alternatively through resistor tap switch 129 or 128 to the subsystem amplifier 119. Amplifier 119 controls motor 120 which operates slider 108 whereby a voltage is derived from potentiometer 107 which balances the voltage from signal generator 22. Thus the vertical gyroscope signal generator 22 voltage signal is opposed by an equal signal applied to terminal 101.

When it is desired, while in the control stick mode, to fly at selected normal accelerations, the condition of the switches are, switch 61 may remain closed, switch 67 open, switch 170 open, switch 167 closed, switch 152 closed and switch 166 open. Since the aircraft will not at this time be immediately flying at the selected number of G's obtained from potentiometer 146 the terminal 145 will have an unbalanced voltage applied thereto and this voltage through switch 152, voltage divider 153, lag network 154, resistor 157 is applied to network summing conductor 15 of network 14 to effect unbalance of the network. This unbalance operates the autopilot amplifier 12 and pitch attitude servo 11 which operates the pitch attitude changing means of the craft and additionally operates potentiometer slider 27 to rebalance the network.

The normal accelerometer 143 will respond to the increased acceleration of the craft from operation of the attitude changing means and will derive an opposing signal from potentiometer 140 to tend to provide a balance at terminal 145. The indicator 169 should have its pointer at the zero position. If the pointer is not at the zero position, the pilot may observe the same and operate slider 50 to provide a further signal whereby the pitch attitude changing means is additiontionally displaced until the indicator pointer is brought to its normal position at which time the terminal 145 is at zero voltage indicating that the output of the acceleration selection potentiometer 146 is balanced by the voltage from the acceleration responsive potentiometer 140.

As the aircraft increases attitude upwardly while controlled to normal acceleration, the pitch attitude gyroscope 160 monitors such change in pitch attitude. Ultimately when the aircraft attains a high pitch attitude, a gyroscope operated switch 158 will be closed to operate a device 159. This device may be an indicator, alarm, or may have other desired function.

Should the pilot desire, he may return to pitch attitude control from normal acceleration control by repositioning the switches and may thereafter by operating slider 50 select any desired pitch attitude to be maintained by gyroscope 160.

It will now be apparent that I have provided an arrangement wherein a single vertical gyroscope may be utilized in at least two aircraft sub-systems as a control device; wherein one sub-system which serves primarily as an attitude monitor requires the orientation of the gyroscope so that the outer gimbal of the two degree of freedom gyroscope measures pitch angle; and wherein such orientation results in a by product of cross coupling from roll to pitch causing inaccuracies; and further that a novel compensation arrangement has been provided to correct for the inaccuracies in sensing pitch attitude from the outer gimbal while the other sub-system or automatic pilot is utilized to control the craft.

While but one embodiment of the invention has been described, obvious modifications will occur to those skilled in the art without departing from the principles of the invention.

What is claimed is:

1. In an automatic pilot for an aircraft having pitch attitude changing means, in combination: servo means operating said pitch attitude changing means; manual means operating said servo means to select a pitch attitude; pitch attitude responsive sensing means comprising a vertical gyroscope having two axes of freedom and having three hundred sixty degrees of freedom in the pitch axis for indicating craft pitch attitude measured in a vertical plane; and further means compensating for an apparent change in pitch attitude of the craft sensed by said pitch attitude responsive means but caused by change in craft bank angle or roll attitude.

2. In an automatic pilot for an aircraft having pitch attitude changing means, in combination: servo means operating said pitch attitude changing means; means operating said servo means to select a pitch attitude; pitch attitude responsive sensing means, comprising a gyro vertical having an inner and an outer gimbal ring and trunnions pivotally supporting said gimbal rings said gyro being mounted so that during change in pitch attitude of the craft longitudinal axis in a vertical plane and relative to the earth surface the gyro rotor spin axis has no tendency to align itself with a trunnion axis, to stabilize craft pitch attitude; and further means compensating for an apparent change in relative pitch attitude of the craft and earth sensed by said gyro vertical but caused by change in craft roll attitude about its longitudinal axis.

3. Craft attitude sensing means comprising: a gyro horizon having an inner gimbal trunnion and an outer gimbal trunnion with the outer gimbal trunnion normally parallel with the axis to be sensed so as to have three hundred sixty degrees of freedom with respect to said axis, signal means operated by said gyroscope in accordance with change in attitude relative to the horizontal about said axis; and further means compensating said signal for an apparent change in said attitude about said axis relative to the horizontal caused by change in attitude about an axis at right angles to said first axis.

4. In an automatic pilot for a dirigible craft having attitude changing means, in combination: servo means operating said attitude changing means; means operating said servo means to select a desired attitude about an axis; attitude responsive sensing means comprising a two axis of freedom gyroscope having an inner trunnion and an outer trunnion with said outer trunnion arranged in the direction of the axis to be sensed; signal means operated by said gyro upon rotation of said outer trunnion relative to the craft and controlling said attitude changing means; and further means compensating for an apparent change in attitude about said axis but caused by change in attitude about an axis perpendicular to said first axis.

5. In an automatic pilot for an aircraft having attitude changing means, in combination: servo means operating said attitude changing means; manual means operating said servo means to select an attitude; a vertical gyroscope sensing craft attitude and mounted in the aircraft with substantially three hundred sixty degrees of freedom about said axis; signal means operated by said gyroscope in accordance with change in attitude being sensed; attitude synchronizing means responsive to said attitude responsive means during operation of said manual means and balancing said signal means; and further means compensating said synchronizing means for an apparent change in aircraft attitude sensed by said gyroscope by change in aircraft attitude about an axis at right angles to said axis being sensed.

6. In an automatic pilot for an aircraft having means to change attitude about an axis; additional means operating said attitude changing means; a gyro vertical having two axes of freedom and comprising an inner trunnion and an outer trunnion, the latter in the direction of the said axis of the craft; signal means operated by said gyro vertical upon relative rotation of said outer trunnion and aircraft and controlling said additional means to maintain an attitude relative to the earth and further means compensating said signal means for an apparent relative change in craft attitude and the earth about said first axis and affecting said gyroscope but due to change in craft attitude about an axis of the craft perpendicular to said first axis.

7. In navigation apparatus for an aircraft, in combination: a gyro horizon comprising an inner trunnion and an outer trunnion, the latter in the direction of an axis of a craft about which control is to be effected; signal means operated by said gyro horizon in accordance with change in craft attitude or departure from the horizontal and in a vertical plane of a second axis of the craft, normal to the first axis; further means controlled by said signal means; and additional means correcting said signal means for apparent changes in craft attitude about the outer trunnion due to changes in craft attitude about the inner trunnion.

8. In an automatic pilot for an aircraft having pitch attitude changing means, in combination: servo means operating said pitch attitude changing means; means controlling said servo means to select a pitch attitude; pitch and roll attitude responsive signal means, comprising a gyro horizon, also controlling said servo means to maintain a pitch attitude flight condition of the aircraft; means in said signal means and responsive to roll of the craft compensating said signal means for apparent change in pitch attitude due to change in roll attitude; further means rendering said pitch attitude responsive means ineffective to control said servo means and additionally controlling said servo means to establish a second condition of flight of said craft; and additional control means operated by said attitude means at a predetermined attitude while the craft responds to said further means when controlled to said second condition.

9. In an automatic pilot for an aircraft having pitch attitude changing means, in combination: servo means operating said pitch attitude changing means; manual means operating said servo means to select a pitch attitude flight condition of the craft; a craft pitch and roll responsive horizon gyro having two axes of freedom and having its outer gimbal trunnion sensing pitch attitude or angle in a vertical plane between the craft longitudinal axis and the horizontal or surface of the earth; signal means responsive to change in pitch attitude sensed by said gyro and operating said servo means to maintain the selected pitch attitude relative to the earth; means compensating said signal means for apparent change in pitch attitude due to change in roll attitude of the craft about its longitudinal axis determined by the angle between a line perpendicular to the craft plane of symmetry and a horizontal plane measured in a vertical plane; further means rendering said signal means ineffective on said servo means and controlling said servo means in accordacne with the second condition of flight of the craft; and additional means operated by said gyro at a predetermined pitch attitude of the craft while said craft is being controlled to said second flight condition.

10. In an automatic pilot for an aircraft having pitch attitude changing means and servo means operating said pitch attitude changing means, in combination: a horizon gyroscope with but two axes of freedom and having its outer gimbal trunnion in the direction of craft pitch axis and its inner trunnion in the direction of craft longitudinal axis; signal means responsive to angular displacement of said gyro outer trunnion relative to the aircraft and operating said servo means to maintain craft pitch attitude; means compensating said signal means for apparent change in pitch attitude due to change in craft roll attitude about its longitudinal axis; further means rendering said signal means ineffective on said servo means and controlling said servo means in accordance with a selected normal acceleration for the craft; and additional means operated by said horizon gyro at a predetermined pitch attitude of the craft while said craft is being controlled to said selected normal acceleration.

11. In an automatic pilot for an aircraft having pitch attitude changing means and servo means operating said pitch attitude changing means, in combination: a horizon gyro of the displacement type having two axes of freedom and including an outer gimbal trunnion or one axis aligned with the direction of the pitch axis of the craft; signal means responsive to angular operation of said outer trunnion relative to said craft and controlling said servo means to maintain a flight condition of constant craft pitch attitude; means responsive to angular displacement about the other axis for compensating said signal means for apparent change in pitch attitude of the aircraft sensed by said outer gyro trunnion but due to change in craft roll attitude; further means rendering said signal means ineffective on said servo means and controlling said servo means in accordance with a second condition of flight of the craft involving a change in craft pitch attitude; and additional means operated by said gyro horizon at a predetermined pitch attitude of the craft while being controlled to said second flight condition.

12. In navigation apparatus for an aircraft, in combination: a horizon gyro comprising a rotor having its spin axis normally vertical, said rotor being journaled for rotation in an inner gimbal, said gimbal having trunnions supporting said inner gimbal in an outer gimbal, with the outer gimbal having trunnions journaled on the craft in the direction of the pitch axis thereof; signal means operated in response to the relative angular movement of said outer gimbal trunnion and said craft in accordance with pitch attitude changes of the craft relative to the earth; and means compensating said signal means for apparent changes in pitch attitude but due to change in roll attitude of the craft about its longitudinal axis; and operating means responsive to said signal means.

13. In an automatic pilot for an aircraft having an elevator control surface and motor means positioning said surface, in combination: a pitch gimbal adapted to be mounted upon the aircraft to pivot about the pitch axis of the craft; a second gimbal mounted on said pitch gimbal to pivot about an axis normal to said pitch axis; attitude responsive means mounted in said second gimbal to maintain said second gimbal in fixed angular relation with the vertical; signal means operated by relative pivoting of said pitch gimbal and craft attitude; and means responsive to pivotal movement of said second gimbal and connected to said signal means for compensating for an apparent change in pitch attitude from said pitch gimbal caused by change in craft attitude about the axis normal to the pitch axis.

14. In an automatic pilot for an aircraft having an elevator and motor means for positioning said elevator, in combination: a pitch gimbal adapted to be mounted upon said aircraft to pivot about the pitch axis thereof; a roll gimbal mounted on said pitch gimbal to pivot about the roll axis normal to said pitch axis; stop means for limiting the movement of the roll gimbal about said roll axis; a gyro rotor mounted on an axis normal to both said axes of said gimbals; signal means operated by said pitch gimbal upon relative angular movement of the craft and gyroscope rotor; means for controlling said motor means from said signal means; and further means responsive to said bank gimbal and compensating said signal means for an apparent change in pitch attitude of the craft relative to the earth caused by change in craft roll attitude about the roll axis.

No references cited.